United States Patent [19]

Bottcher et al.

[11] Patent Number: 5,429,865
[45] Date of Patent: Jul. 4, 1995

[54] COMPOSITE MATERIALS

[75] Inventors: Axel Bottcher, Wesel; Ulrich Stieber, Mulheim; Michael Mohr; Achim Fels, both of Wuppertal, all of Germany

[73] Assignees: Rutgerswerke Aktiengesellschaft; Akzo Nobel Faser AG, both of Germany

[21] Appl. No.: 294,645

[22] Filed: Aug. 23, 1994

[30] Foreign Application Priority Data

Sep. 6, 1993 [DE] Germany .......... 43 29 890.7

[51] Int. Cl.⁶ .............................. B32B 7/00
[52] U.S. Cl. ................... 428/246; 428/252; 428/253; 428/257; 428/284; 428/287; 428/408; 428/902; 428/911
[58] Field of Search .......... 428/902, 911, 246, 252, 428/257, 253, 284, 287, 408

[56] References Cited

U.S. PATENT DOCUMENTS

| 3,353,187 | 11/1967 | Lastnik et al. ............... 2/3 |
| 5,229,199 | 7/1993 | Miner et al. ............... 428/902 |
| 5,330,820 | 7/1994 | Li et al. ............... 428/902 |

FOREIGN PATENT DOCUMENTS

| 29858 | 5/1970 | Australia . |
| 3928408 | 4/1990 | Germany . |
| 811634 | 4/1959 | United Kingdom . |
| 8801010 | 3/1984 | WIPO . |

OTHER PUBLICATIONS

Copy of Search Report (5 pages).
Copy of Army Materials Article Nov. 1975 No. 009,124.
Copy of Derwent Abstract (1 page) 85-095048.
Copy of Patent Abstracts of Japan (1 page) JP5098229.
Copy of Derwent Abstract (1 page) No. 82-78737E.
Copy of Derwent Abstract (1 page) No. 90-219842.
Copy of Derwent Abstracts (1 page) No. 84-065095.
Copy of Derwent Abstract (1 page) No. 87-174765.

*Primary Examiner*—James J. Bell
*Attorney, Agent, or Firm*—Bierman and Muserlian

[57] ABSTRACT

A composite material comprising a fabric of high-modulus fiber material and optionally a portion of other synthetic fiber material and a binder, the binder layers being essentially disposed only between fabric plies, the binder being a resol modified with polyvinyl butyral, the resol content being 4 to 20% by weight and the polyvinyl butyral content being 75 to 95% by weight of the binder suitable for projectile inhibiting laminates for the manufacture of protective helmets and armor against projectiles.

4 Claims, No Drawings

COMPOSITE MATERIALS

For military purposes, laminates for protection from projectiles are produced with the use of a binder consisting, for instance, of 50% by weight of phenolic resin and 50% polyvinyl butyral. The individual fabrics are impregnated with this binder and the prepregs obtained are pressed together at elevated temperatures, with the binder setting and imparting to the composite material the necessary strength and at the same time the desired elasticity.

According to EP-B 0,169,432, laminates of an especially good retention capacity to projectiles are obtained if the textile nature of the individual fabric plies is preserved and the binder connecting the fabrics is present as a binder layer wetting only the outer layer of the fabric filaments. Thereby, an especially good shock absorption effect is obtained upon impact of the projectile. Regarded as preferred binders are thermoplasts, particularly acrylic resins, because they apply well on the surface of fabrics without impregnating them. For protective helmets, however, the strength and elasticity of the laminates obtained are not sufficient.

OBJECTS OF THE INVENTION

It is an object of the invention to provide composite materials of high-modulus fiber materials having the strength and elasticity of present military helmets and having an improved projectile dampening effect without increased layer thickness, i.e. weight increase and products prepared therefrom.

It is another object of the invention to provide a novel binder for composite materials.

These and other objects and advantages of the invention will become obvious from the following detailed description.

THE INVENTION

The novel composite materials of the invention are comprised of a fabric of high-modulus fiber material and optionally a portion of other synthetic fiber material and a binder, the binder layers being essentially disposed only between fabric plies, the binder being a resol modified with polyvinyl butyral, the resol content being 4 to 20% by weight and the polyvinyl butyral content being 75 to 95% by weight of the binder.

It has been found that a composite material consisting of a fabric of high-modulus fiber materials made with a binder on a basis of phenolic resin/polyvinyl butyral, still has sufficient strength even when the binder contains only 4 to 20% by weight of resol. On the other hand, a binder which contains 4 to 20% by weight of resol, 75 to 95% by weight of polyvinyl butyral and 1 to 5% by weight of a hardening agent can be used on fabrics as a thin layer without impregnating it. This binder can even be produced in the form of a foil which opens up possibilities for manufacturing processes of composite materials that are not possible with impregnating resin mixtures of high phenolic resin content. The composite materials and the helmets made from them, which are produced by pressing fabrics coated with the binder of the invention or by pressing alternative layers of fabric and binder foil show sufficient strength and elasticity and an improved effect of dampening projectile impact.

These are composite materials of fabrics of high modulus fiber materials and optionally part of other synthetic filaments and binder, the binder layer being disposed essentially only on the outer faces of the fabric filaments and the binder being a resol modified with polyvinyl butyral.

The fabrics used are known per se, as are also the high-modulus fiber materials. The preferred fiber is aramide fiber and other high modulus fiber materials are carbon, boronitride, silicon carbide or tungsten fibers, which may be woven into the fabrics to reinforce aramide fibers. For reasons of cost, however, also other fiber materials may be incorporated in the fabric, as for instance polyethylene, polyvinyl alcohol, polyacrylic nitrile, polyester or polyamide fibers. Preferably, fabrics of one type of fiber are combined with fabrics of another type of fiber.

The term fabric in the sense of the present invention comprises all flat textile structures such as woven goods, stitch goods such as knit or woven or nonwoven goods, etc.

Resols are phenol- or cresol-formaldehyde condensation products produced in an alkaline medium, starting with a molar ratio of phenol (cresol) : formaldehyde of 1:1 to 1:3, preferably of 1:2 to 1:3. Preferred are low molecular weight resol types (1 to 4 nuclei), the neutralized anhydrous resins being usually dissolved in a low molecular weight alcohol and being mixed as a solution with a corresponding solution of polyvinyl butyral. As polyvinyl butyral, all commercial types can be used. Preferred are those with a butyral content of 75 to 80% and an oxygen content of 18 to 21%. These polymers, too, are preferably dissolved in an alcohol.

Alternatively, dry and solvent-free resol, polyvinyl butryal and hardening agent may be homogenized together, extruded and calendared.

The resin solutions are mixed together, a hardening agent added (acid anhydride, such as e.g. phthalic acid, hexahydrophthalic acid, pyromellitic acid or fumaric acid anhydride), and the mixture is poured onto a separating foil. After evaporation of the solvent, the binder layer is produced as a separate foil (30 to 6 $g/m^2$), prepolymerized by brief heating (about 1 minute) to about to 90° C., and thereby made non-tacky and used as such as needed.

Accordingly there are two different processes for the production of the composite materials of the invention.

a. Fabrics coated with the binder are produced and possibly prepolymerized by brief heating (1 minute) to about 80 to 90° C., to obtain non-tacky products which are storable. To manufacture the composite materials, depending on the desired thickness of protective effect, several (10 to 25) plies of the unilaterally or bilaterally coated fabrics are stacked and pressed together as in the prior art, shaping at 140 to 180° C. for 30 to 90 minutes, the pressing pressure being in the range of 3 to 10 bars. In so doing, the fabric layers are bonded together and the binder hardened fully without penetrating into the fabric.

b. Depending on the desired thickness of the composite material, several uncoated fabric plies are stacked, a foil of binder being placed between the fabrics. The entire assembly of these plies is then pressed together under virtually the same conditions as in case a.

In the following examples, there are described several preferred embodiments to illustrate the invention. However, it should be understood that the invention is not intended to be limited to the specific embodiments.

EXAMPLE 1

The standard resin composition according to US specification LP/DES 12-78 B (50% phenol resin, 50% polyvinyl butryal) was applied by coating on a Twaron fabric of the Akzo Company (Style T 750) at a rate of 460 g/m² in a resin application of 13%. From this coated material, there was made (a) 1 12-ply laminate (6.28 kg/m²) and (b) a 13-ply laminate. The bombardment results were compared in Table 1 with the binder of the invention comprised of 75% polyvinyl butyral, 20% of resol resin and 5% of phthalic acid anhydride, % being by weight. Also Twaron fabric T 750 was coated with the resin of the invention and a 12-ply laminate was made therefrom. The laminate production occurred by pressing at 160° C. for 30 minutes.

TABLE 1

| Laminate | $V_{50}$ Value (m/s) |
| --- | --- |
| Standard resin 12-ply | 525 |
| Standard resin 13-ply | 539 |
| Resin of Invention 12-ply | 545 |

The $V_{50}$ value was determined according to Stanag 2920 with 17 grain splinters.

EXAMPLE 2

The standard resin composition according to US Specification LP/DES 12-78 B was applied by coating on a Twaron fabric "high strength" of Akzo (Style CT 736) at a rate of 410 g/m² in a resin application of 13%. From this coated material, a 12-ply laminate (5.526 kg/m²) was made. With the binder of the invention of Example 1, Twaron fabric CT 736 was also coated and from it, a 12-ply laminate was made. The laminate production occurred by pressing 160° C. for 30 minutes. In Table 2, the $V_{50}$ value according to Stanag 2920 was compared with 17 grain splinters.

TABLE 2

| Laminate | $V_{50}$ Value (m/s) |
| --- | --- |
| Standard resin 12-ply | 519 |
| Resin per invention 12-ply | 541 |

EXAMPLE 3

The laminate production occurred as in Example 1. With the standard resin, however, a 10-ply laminate, and with the resin of the invention, a 9-ply laminate were produced, and the bullet bombardment with a 9 mm Para according to SK I (German Police Standard) were compared. The two laminates show the same bombardment resistance, but differ greatly in their weight.

| Standard Resin: |
| --- |
| 10-ply laminate T 750 → 5.23 kg/m² |
| 9-ply laminate T 750 → 4.71 kg/m² |

Various modifications of the compositions and method of the invention may be made without departing from the spirit or scope thereof and it is to be understood that the invention is intended to be limited only as defined in the appended claims.

What we claim is:

1. A composite material comprising a fabric of plies of high-module fiber material and a binder and optionally a portion of other synthetic fiber material, the binder being essentially disposed only between fabric plies, the binder being a resol modified with polyvinyl butyral, the resol content being 4 to 20% by weight and the polyvinyl butyral content being 75 to 95% by weight of the binder.

2. A binder for composite materials comprising 4 to 20% by weight of a resol, 75 to 95% by weight of polyvinyl butryal and 1 to 5% by weight of a hardening agent.

3. A binder of claim 2 in the form of a foil.

4. A composite material of claim 1 wherein the binder is in the form of layers of foil.

* * * * *